(12) United States Patent
Franco (10) Patent No.: US 8,748,771 B2
(45) Date of Patent: Jun. 10, 2014

(54) ELECTRIC SWITCHGEAR PANEL WITH IMPROVED ARC PROTECTION ASSEMBLY

(75) Inventor: Walter-Salvatore Franco, Bergamo (IT)

(73) Assignee: ABB Technology AG, Zurich (CH)

( * ) Notice: Subject to any disclaimer, the term of this patent is extended or adjusted under 35 U.S.C. 154(b) by 464 days.

(21) Appl. No.: 13/109,834

(22) Filed: May 17, 2011

(65) Prior Publication Data

US 2011/0292575 A1    Dec. 1, 2011

(30) Foreign Application Priority Data

May 26, 2010   (EP) ..................................... 10163878

(51) Int. Cl.
*H01H 33/08*   (2006.01)
*H05K 5/00*    (2006.01)
*H02B 7/00*    (2006.01)

(52) U.S. Cl.
USPC ........ 218/157; 200/306; 174/17 VA; 361/605

(58) Field of Classification Search
USPC .............................. 361/600–640; 174/17 VA; 218/155–158; 200/306
See application file for complete search history.

(56) References Cited

U.S. PATENT DOCUMENTS

| | | | |
|---|---|---|---|
| 5,710,402 A * | 1/1998 | Karnbach et al. ............. | 218/157 |
| 5,767,440 A | 6/1998 | Byron et al. | |
| 6,407,331 B1 * | 6/2002 | Smith et al. ..................... | 174/50 |
| 6,417,443 B1 * | 7/2002 | Smith ........................ | 174/17 VA |
| 6,597,571 B2 * | 7/2003 | Kubota et al. ................. | 361/695 |
| 6,791,027 B1 * | 9/2004 | Nicolai et al. ................... | 174/50 |
| 7,391,597 B2 * | 6/2008 | Meeks et al. .................. | 361/115 |
| 7,821,774 B2 * | 10/2010 | Josten et al. .................. | 361/605 |
| 8,242,395 B2 * | 8/2012 | Josten et al. .................. | 200/306 |
| 8,375,566 B2 * | 2/2013 | Ballard et al. .................. | 29/604 |

FOREIGN PATENT DOCUMENTS

| | | |
|---|---|---|
| DE | 7232011 | 11/1972 |
| DE | 83 12 297.4 | 10/1983 |
| DE | 8901423 | 3/1989 |
| DE | 10 2007 022 363 A | 11/2008 |
| WO | 2004/034536 A1 | 4/2004 |
| WO | 2008/136113 A1 | 11/2008 |

* cited by examiner

*Primary Examiner* — Zachary M Pape
(74) *Attorney, Agent, or Firm* — Melissa J. Szczepanik (57) ABSTRACT

A switchgear panel comprises an enclosure having an internal volume suitable to accommodate corresponding electrical or electronic equipment, and an arc protection assembly which is operatively associated to a wall of the enclosure. The arc assembly comprises at least a first barrier element having a first surface which is provided with one or more first through openings defining each a respective same first venting area, and a second barrier element which comprises a second surface provided with one or more second through openings defining each a respective same second venting area. The first venting area of each first through opening is different from the second venting area of the second through openings.

16 Claims, 9 Drawing Sheets

ELECTRIC SWITCHGEAR PANEL WITH IMPROVED ARC PROTECTION ASSEMBLY

CROSS-REFERENCE TO RELATED APPLICATION

This application claims priority under 35 U.S.C. §119(a)-(d) to European Patent Application Serial Number 10163878.1, filed on May 26, 2010, the entire contents of which are hereby incorporated by reference.

FIELD OF INVENTION

The present invention relates to an electric switchgear panel with an improved arc protection assembly.

BACKGROUND

As is well known in electrical energy distribution systems, switchgear panels are electrical components used as node points, while cables and overhead lines represent the conjunction of the various nodes.

From a structural point of view, known switchgear panels, which can be also indicated with the equivalent terms of electric switchboards, or simply switchgear or electric panels, or similar definitions, usually comprise a metallic enclosure that is internally divided into several compartments or cells housing various apparatuses and equipment. For example, one compartment houses a switching unit, such as a circuit breaker; a second compartment houses main cables, such as bus-bars, feeding power from an electrical source; a further compartment houses a system of cables suitable to be connected to a load, for example an electrical motor. Depending on the application, switchgear panels may comprise other components that include but are not limited to current transformers, fuses, and voltage transformers.

During the working life of a switchgear panel, electrical faults or malfunctions may occur, such as short circuits, current overloads, and in particular, arcing events. Arcing events, e.g. arcing faults or flashes, occur when electric current arcs strike between two conductors inside the switchgear cabinet, e.g. between phase conductors, phase and neutral conductors, between the contacts of the circuit breaker used, between a conductor and ground, or another situation. When arcing faults occur, in particular in medium- to high-voltage power applications wherein the levels of energy involved are quite significant, the ionized gas associated with them may be released at significant pressures and temperatures sufficient to severely damage or destroy the switchgear panel, and/or the devices and equipment housed inside. An arcing fault may also be dangerous for operating personnel or equipment outside the enclosure. In particular, the materials involved in or exposed to the arc produce hot decomposition products, both gaseous and particulate either plastic and/or metallic, which may be discharged to the outside of the enclosure together with or in addition to hot gases and flames.

Due to the aforementioned problems, safety standards and related tests have been introduced. For example, one typical standard test utilizes highly flammable indicators, such as pieces of cotton or equivalent material, which are placed outside the switchgear enclosure around the perimeter of the enclosure at a certain distance from some or all of the lateral walls of the enclosure. During the test and more particularly, when an internal arc is caused to strike, these flammable indicators must not ignite.

Hence, such standards have imposed onto switchgear manufacturers the adoption of protection systems suitable to prevent and/or mitigate the effect of possible electrical arcs. In particular, many known solutions are focused on early detection of an occurring electric arc with a consequent fast intervention devoted to prevent or mitigate the undesired effects of an electric arc at an early stage.

For example, a first solution foresees the evaluation of current perturbations in a conductor which are indicative of an arcing event; however, this solution may require onerous processing demands resulting in an undesirably long reaction time for identifying an arcing event. Another solution uses pressure sensors to monitor the increase in pressure indicative of an arcing event; also this solution may require significant time before pressure increases to detectable levels, resulting in long reaction times before mitigating an arcing event.

One of the most used solutions for detecting arcing events involves the use of optical detectors, such as optical fibers, to detect visible light and thereby to sense the arc flash associated with an arcing event. However, this solution may result in erroneous detections as the light sensors may detect light from sources independent from electric arcs. This may further result in unwarranted tripping of protection units which would put out of service the whole switchgear panel or parts thereof.

In some cases, a combination of different types of arc protection systems has been used. For example, undesired interventions have been partially limited by combining the detection of light possibly linked to an occurring electric arc with monitoring of the current levels flowing into the part of the electric system being monitored.

Other solutions are instead focused on limiting the resulting effects of an electric arc. For example, arc-resistant switchgear cabinets are widely used and able to mechanically withstand the pressure waves and temperatures of the hot gases associated with an arcing fault; in some other cases there are provided specific parts of the enclosure which may blow up due to an electric arc occurring inside the enclosure.

In addition or in alternative, there are provided also suitable paths for channeling and venting the hot gases and flames generated by an arcing fault out from the internal compartments towards a desired area. For example, there are provided flaps or ducts which lead the hot gases, flames and particulate to the outside environment through the ceiling of the enclosure or in some cases even underground, i.e. toward zones far away from the possible presence of operating personnel.

Although known solutions perform satisfactorily, there is still room for further improvements in arc protection for switchgear. For example, the ceiling and wall of the room wherein the switchgear panel is located may deflect hot gasses, flames and particles, down onto personnel working near the panel thus being still potentially dangerous.

SUMMARY

The switchgear panel of the present invention comprises an enclosure having a plurality of walls which delimit an internal volume suitable to accommodate corresponding electrical or electronic equipment, and at least a first wall of the plurality of walls being provided with one or more openings. The switchgear panel according to the present invention comprises, in particular, an arc protection assembly which is operatively associated to at least the first wall and comprises at least a first barrier element having a first surface which is provided with one or more first through openings defining each a first venting area. The switchgear panel comprises a second barrier element which is operatively associated to the first barrier element comprises a second surface provided with one or more second through openings defining each a second venting area. The first venting area of each first through opening of the one or more first through openings is different from the second venting area of each second through opening of the one or more second through openings.

BRIEF DESCRIPTION OF THE DRAWINGS

In the accompanying drawings, structural embodiments are illustrated that, together with the detailed description provided below, describe exemplary embodiments of a switchgear panel according to the present invention. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

Further characteristics and advantages of the invention will emerge from the description of preferred, but not exclusive embodiments of the switchgear panel according to the invention. Non-limiting examples of which are provided in the attached drawings, wherein.

DETAILED DESCRIPTION

Figure 1:
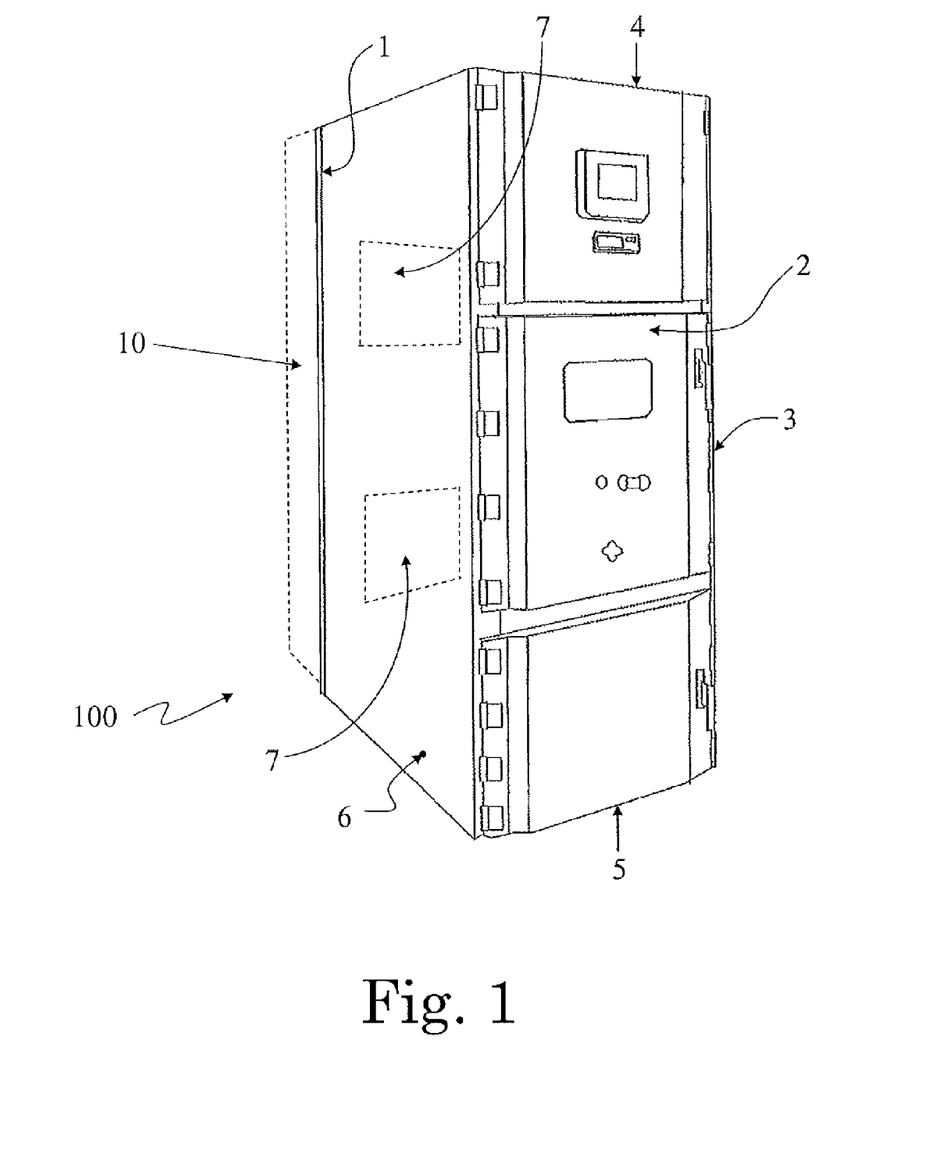
FIG. 1 is a perspective view showing an electric switchgear panel provided with an arc protection assembly according to the invention.

FIG. 1 shows an example of an electric switchgear panel according to the invention, indicated by the overall numeral reference 100 which comprises, according to known solutions, an enclosure having a plurality of walls, namely a rear wall 1, a front wall 2, two lateral walls 3, 6, a top wall 4 and a bottom wall 5, which all together define an internal volume suitable to accommodate various electrical or electronic equipment and/or devices including, but not limited to circuit breakers, bus-bars, cables, and electronic relays.

At least one of the walls of the enclosure, in the embodiment illustrated, preferably the rear wall 1 (hereinafter referred to as the "first wall"), is provided with one or more openings 7, e.g. two as illustrated schematically in FIG. 1 with dotted lines. The one or more opening(s) 7 are suitable to allow venting of the hot gases, flames, particulate, and the like, to the outside of the enclosure, all of which may be generated when an electric arc strikes inside the panel 100.

Advantageously, the switchgear panel 100 according to the present invention comprises an arc protection assembly which is globally indicated by the reference number 10 and is operatively associated to the enclosure of the panel 100. In the embodiment illustrated, the arc protection assembly 10 is positioned outside the enclosure and is operatively associated to at least the first wall 1. As will result more clearly from the following description, the arc protection assembly 10 is devised to mitigate the effects resulting from any electric arc striking inside the enclosure, e.g. hot gases, flames, particulates.

Figure 2:
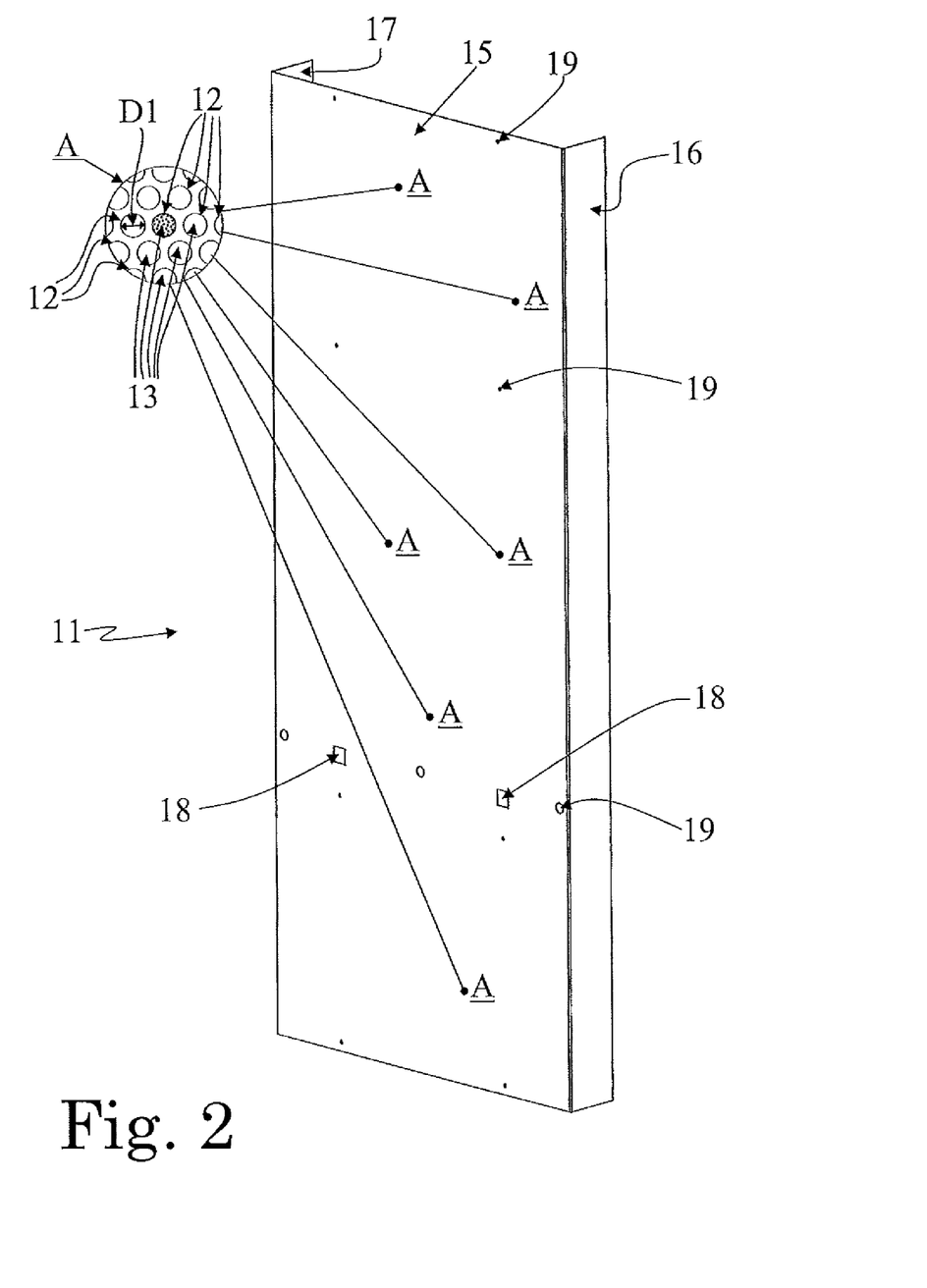
FIG. 2 is a perspective view of a first barrier element of the arc protection assembly of FIG. 1 with a portion magnified in order to better illustrate the structure of the first barrier element.
Figure 3:
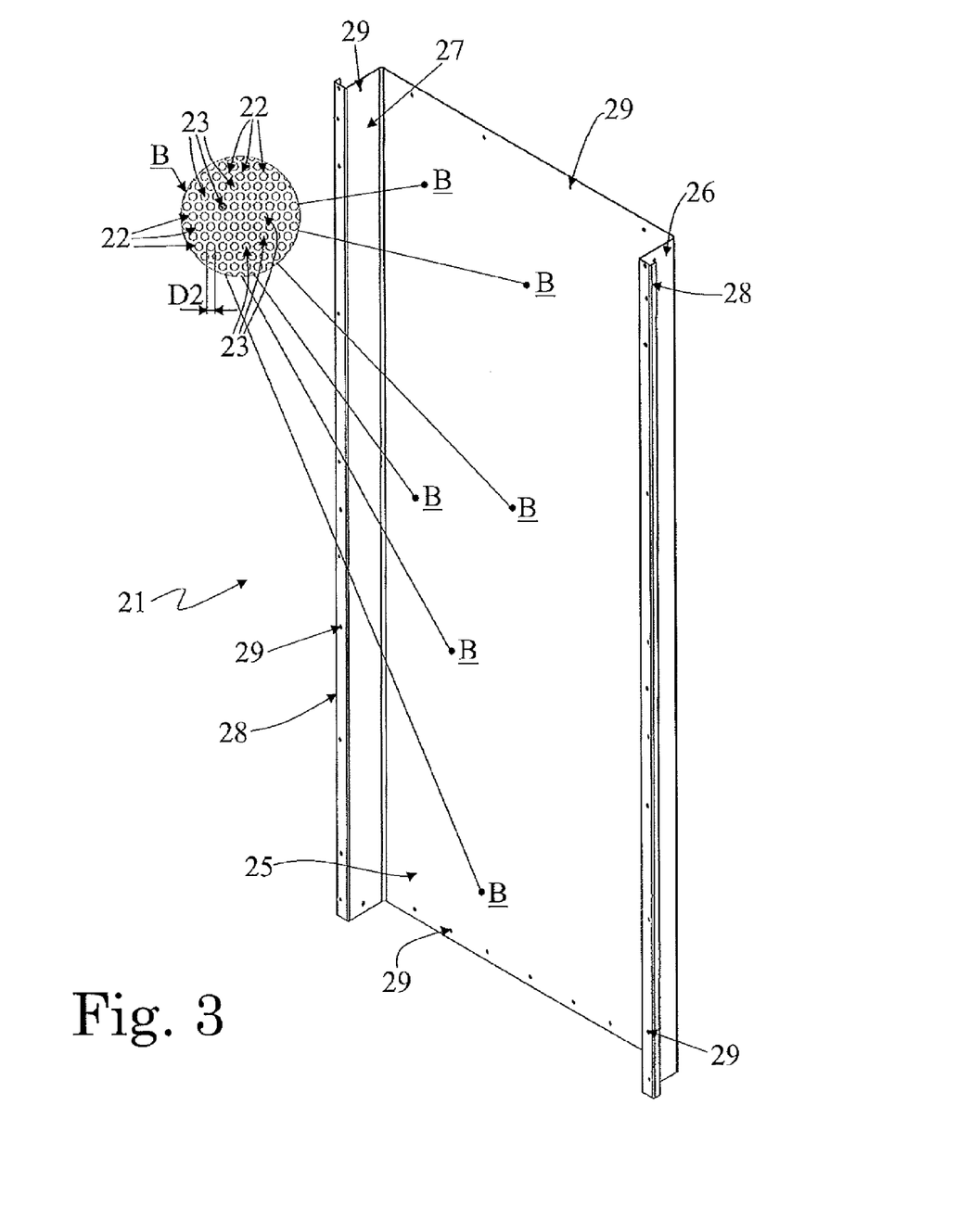
FIG. 3 is a perspective view of a second barrier element of the arc protection assembly of FIG. 1 with a portion magnified in order to better illustrate the structure of the second barrier element.

The arc protection assembly 10 preferably comprises at least a first barrier element 11 and a second barrier element 21, some exemplary embodiments of which are illustrated in FIGS. 2 and 3, respectively. As illustrated in FIG. 2, the first barrier element 11 comprises a first surface 15 which is provided with one or more first through openings 12.

For the sake of simplicity and better illustration, in FIG. 2 a portion (A) of the first surface 15 has been magnified. The magnified portion (A) extends over at least a predominant (i.e. more than about 50%) part of, if not almost all, the entire first surface 15.

The perimeter of the rims of each first opening 12 delimit a through area 13, i.e. a venting area 13 through which the hot gases, flames, and particulates, coming from the inside of the enclosure can pass through. The venting areas 13 defined by each of the first openings 12 are about equal to each other in area. Preferably, the one or more first through openings 12, each of which delimit an equal venting area 13, are randomly positioned on the first surface 15.

In the embodiment illustrated, the first barrier element 11 is constituted by a metallic plate which, seen in section from a top or bottom plan view, is U-shaped. The central side of the U-shaped plate constitutes the first surface 15 and is suitably perforated so as to have the one or more, preferably a plurality of, first though openings 12.

Preferably, as illustrated in FIG. 2, the first through openings 12 are constituted by circular through holes 12, with the front area of each circle forming the respective venting area 13 (an exemplary one of which is marked with points in the magnified portion (A)). Alternatively, there may be first through openings of any shape that is compatible with the scope of the present invention, including but not limited to squared through openings or elliptical through openings, each delimiting the same venting area 13, respectively. In addition, one or more first through openings 12 may also be provided on the two lateral sides 16, 17 of the U-shaped plate 11.

Further, in addition to the one or more first through openings 12 defining each a respective venting area 13, with all venting areas 13 being equal to each other, the barrier element 11 can be provided with other openings having rim perimeters that may delimit a different through area. For example, some openings 18, 19 may be used for receiving fixing screws, venting or both purposes at the same time.

The number of first through openings 12 defining each a respective same venting area 13 provided on the first surface 15 is preferably predominant, i.e. at least more than about half of the holes provided on the first surface 15 are constituted by the indicated first through openings 12.

The second barrier element 21 is operatively associated to the first barrier element 11 and comprises, as illustrated in FIG. 3, a second surface 25 which is provided with one or more second through openings 22. For the sake of simplicity and better illustration, a portion (B) of the second surface 25 has been magnified in FIG. 3. The magnified portion (B)

extends over at least a predominant (i.e. more than about 50%) part of, if not almost all, the entire second surface 25.

The perimeter of the rims of each second opening 22 delimit a through area 23, i.e. a venting area 23 through which can pass the hot gases, flames, particulates, coming from the inside of the enclosure and having already passed the opening(s) 7 and the first openings 12. The venting areas 23 defined by each of the second openings 22 are equal to each other. Preferably, also the one or more second through openings 22 which each delimit an equal venting area 23 are randomly positioned on the second surface 25.

In the embodiment illustrated, the second barrier element 21 is constituted by a metallic plate which, seen in section from a top or bottom plan view, is substantially U-shaped. The central side of the U-shaped plate 21 comprises the second surface 25 and is suitably perforated so as to have the one or more, preferably a plurality of, second though openings 22.

In the same embodiment and as depicted in FIG. 3, the second through openings 22 are constituted by circular through holes 22, with the front area of each circle forming the respective venting area 23 (an exemplary one of which is marked with points in the magnified portion (B)).

Alternatively, the second barrier element 21 may be provided with through openings of another shape as indicated above for the first barrier element 21, e.g. squared, elliptical, or another shape, each delimiting a respective equal area 23. In addition, the one or more second through openings 22 can be also provided on the two lateral sides 26, 27 of the U-shaped plate 21. In the exemplary embodiment of FIG. 3, the two sides 26, 27 present an outwardly folded rim 28 suitable to allow fixing to corresponding walls of the enclosure, as will be described in detail hereinafter.

Also the second barrier element 21 may be provided with openings 29 additional to the one or more second through openings 22 defining all the same respective venting areas 23, and the perimeter of the rims may delimit a different through area. For example, some openings 29 may be used for receiving fixing screws, venting, or both purposes at the same time.

The number of second through openings 22 defining each a respective same venting area 23 provided on the second surface 25 is preferably predominant, i.e. at least more than about half of the second surface 25 may be comprised of the indicated second through openings 22.

Advantageously, in the switchgear panel 100 according to the invention, the first venting area 13 delimited by the rims of each first through opening 12 of the set of one or more first through openings 12 is different from the second venting area 23 delimited by the rims of each second through opening 22 of the set of one or more second through openings 22. According to a particularly preferred embodiment, the first venting area 13 defined by each first through opening 12 of the set of one or more first through openings 12 is larger than the second venting area 23 of each second through opening 22 of the set of one or more second through openings 22. In particular, the second venting area 23 of each second through opening 22 of the set of one or more second through openings 22 is between about 5% to about 50% of the size of the first venting area 13 defined by each first through opening 12 of the set of one or more first through openings 12.

For instance, in the example illustrated, each circular first opening 12 has a diameter $D_1$ of 6 mm while each circular second opening 22 has a diameter $D_2$ of 2 mm. Therefore, each first venting area 13 is equal to 28.26 mm$^2$, while each second venting area 23 is equal to 3.14 mm$^2$.

Figure 4:
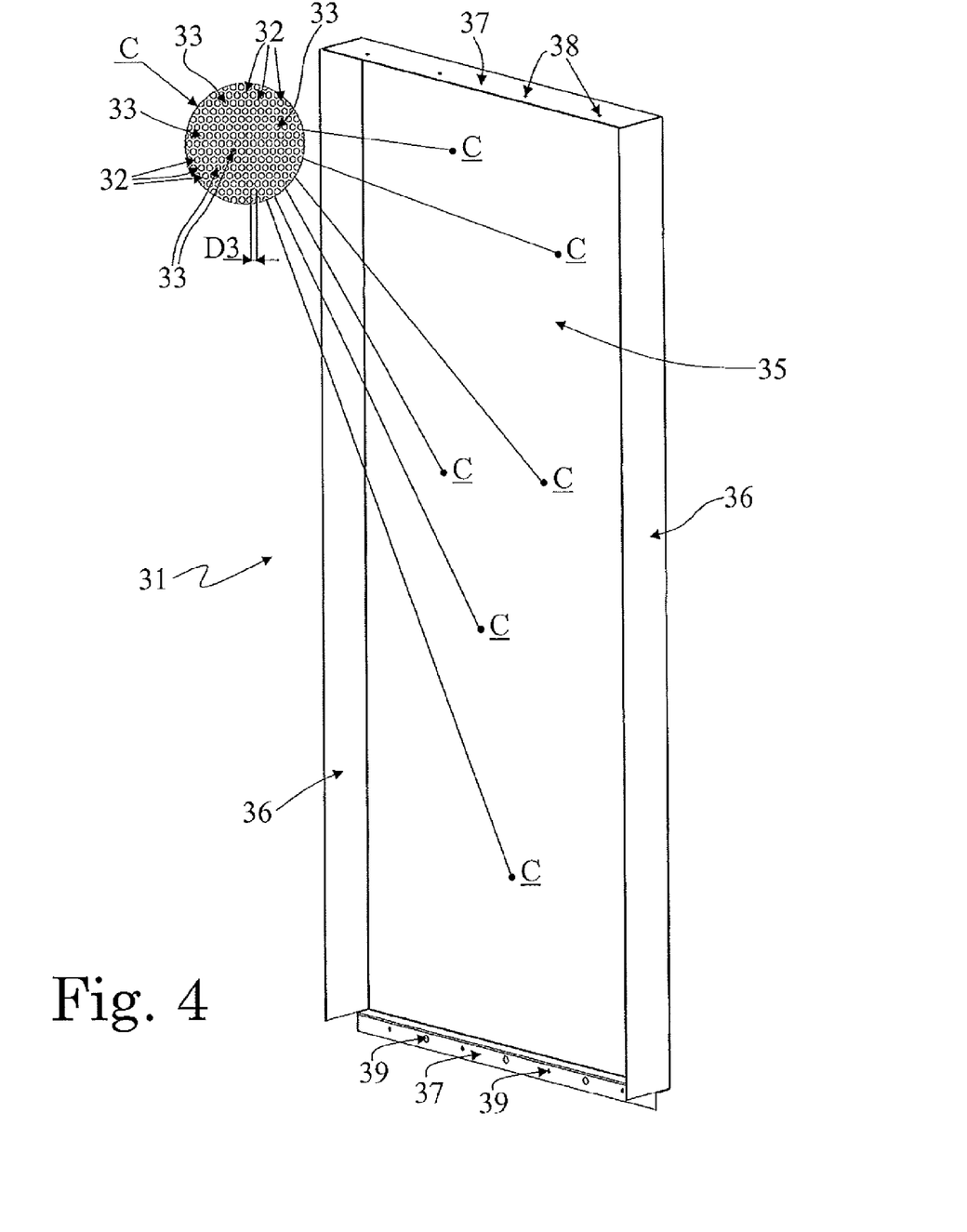
FIG. 4 is a perspective view of a third barrier element of the arc protection assembly of FIG. 1 with a portion magnified in order to better illustrate the structure of the third barrier element.

In order to improve safety on all lateral walls 1, 2, 3, 6 of the enclosure, the arc protection assembly 10 may be provided with a third barrier element 31 which is operatively associated to at least one of the first and second barrier elements 11, 12. Preferably, as illustrated in FIG. 4, the third barrier element 31 comprises a third surface 35 which is provided with one or more third through openings 32. For the sake of simplicity and better illustration, in FIG. 4 a portion (C) of the third surface 35 has been magnified. The magnified portion (C) extends over at least a predominant (i.e. more than 50%) part of, if not almost all, the entire third surface 35.

The perimeter of the rims of each third opening 32 delimit a through area 33, i.e. a venting area 33 through which the hot gases, flames, and particulates coming from the inside of the enclosure can pass through. The various venting areas 33 defined by each of the one or more third openings 32 are about equal to each other. Preferably, the one or more third through openings 32 which delimit about equal venting areas 33, respectively, are randomly positioned on the third surface 35.

In the embodiment illustrated, the third barrier element 31 is constituted by a metallic plate which has a central side 35 suitably perforated so as to have the one or more, preferably a plurality of, third though openings 32, and a plurality of sides 36, 37.

Preferably, as illustrated in FIG. 4, the third through openings 32 are constituted by circular through holes 32, with the front area of each circle forming the respective venting area 33 (an exemplary one of which is marked with points in the magnified portion (C)).

Alternatively, the third through openings 32 may be provided in another shape that is compatible with the scope of the present invention, e.g. there can be squared through openings, elliptical through openings, or other compatible through openings delimiting the same venting area 33, respectively.

Further, in addition to the one or more third through openings 32 each defining about the same venting area 33, respectively, the barrier element 31 may be provided with other openings whose rim perimeters may delimit a different through area. For example, some openings 38, 39 may be used for receiving fixing screws, venting, or both purposes at the same time.

The number of third through openings 32 defining each a respective same venting area 33 provided on the third surface 35 is preferably predominant, i.e. at least more than about half of the third surface 25 may be comprised of the one or more third through openings 22.

Preferably, the third venting area 33 delimited by the rims of each third through opening 32 of the one or more third through openings 32 is different from at least one of the first venting area 13 of each first through opening 12 of the one or more first through openings 12 and the second venting area 23 defined by each second through opening 22 of the one or more second through openings 22.

According to a particularly preferred embodiment, the first venting area 13 defined by each first through opening 12 of the set of one or more first through openings 12 is larger than the third venting area 33 delimited by the rims of each third through opening 32 of the set of one or more third through openings 32. More preferably, the third venting area 33 of each third through opening 32 of the one or more third through openings 32 is even smaller than the second venting area 23 defined by each second through opening 22 of the one or more second through openings 22.

In particular, the third venting area 33 of each third through opening 32 of the set of one or more third through openings 22 should be between about 3% to about 30% of the first venting area 13 defined by each first through opening 12 of the set of one or more first through openings 12. For instance, in the example illustrated, each circular third opening 32 has a diameter $D_3$ of 1.5 mm. Therefore, each first venting area 33 is equal to about 1.76 mm².

Alternatively, the third barrier element 31 may be comprised of a plate that is not perforated (apart from possible holes required for connecting the third barrier element 31 to other components of the arc protection assembly 10) in order to define one or more venting areas.

Figure 5:
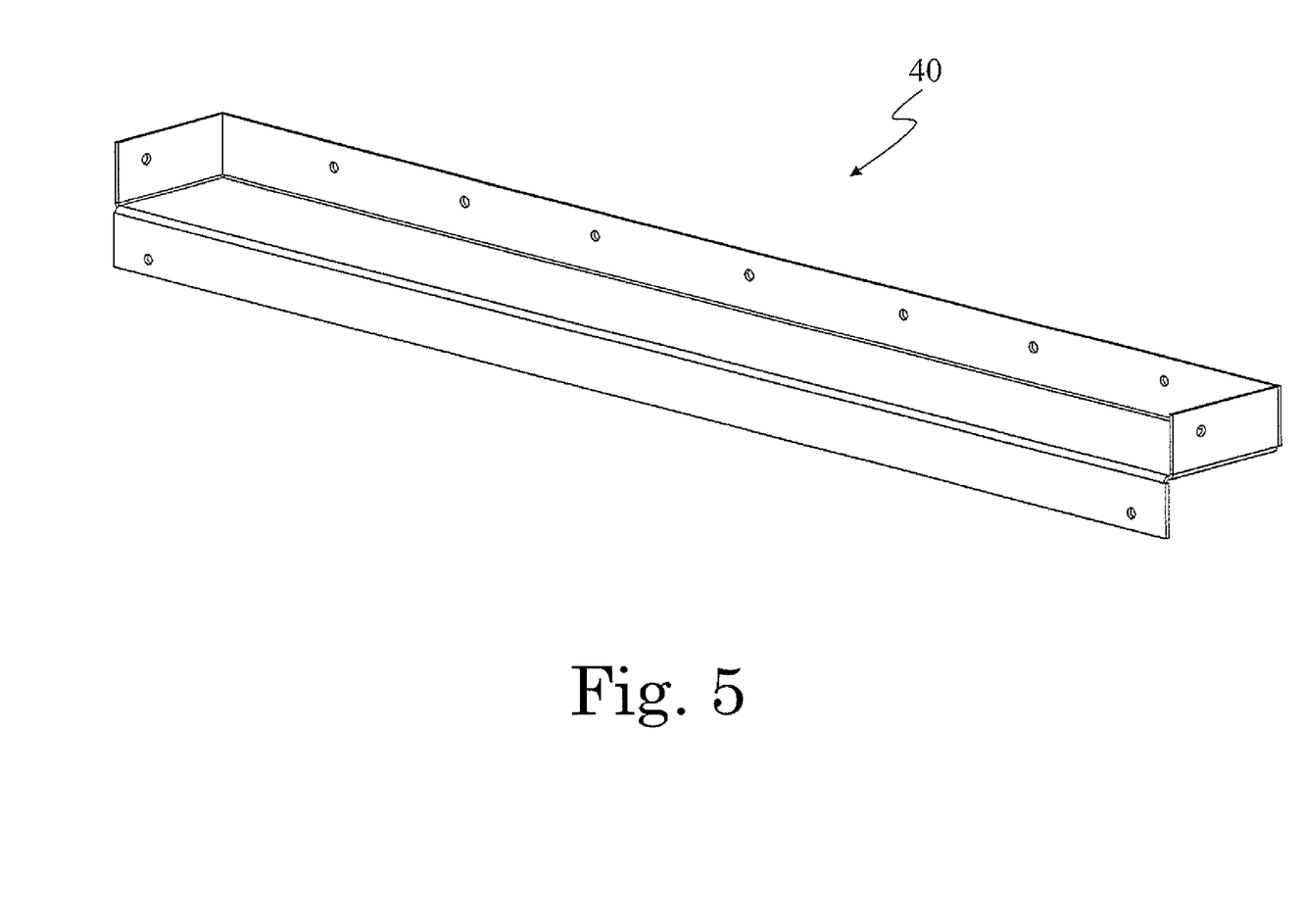
FIGS. 5 and 6 are perspective views of upper and lower covers of the arc protection assembly of FIG. 1, respectively.
Figure 6:
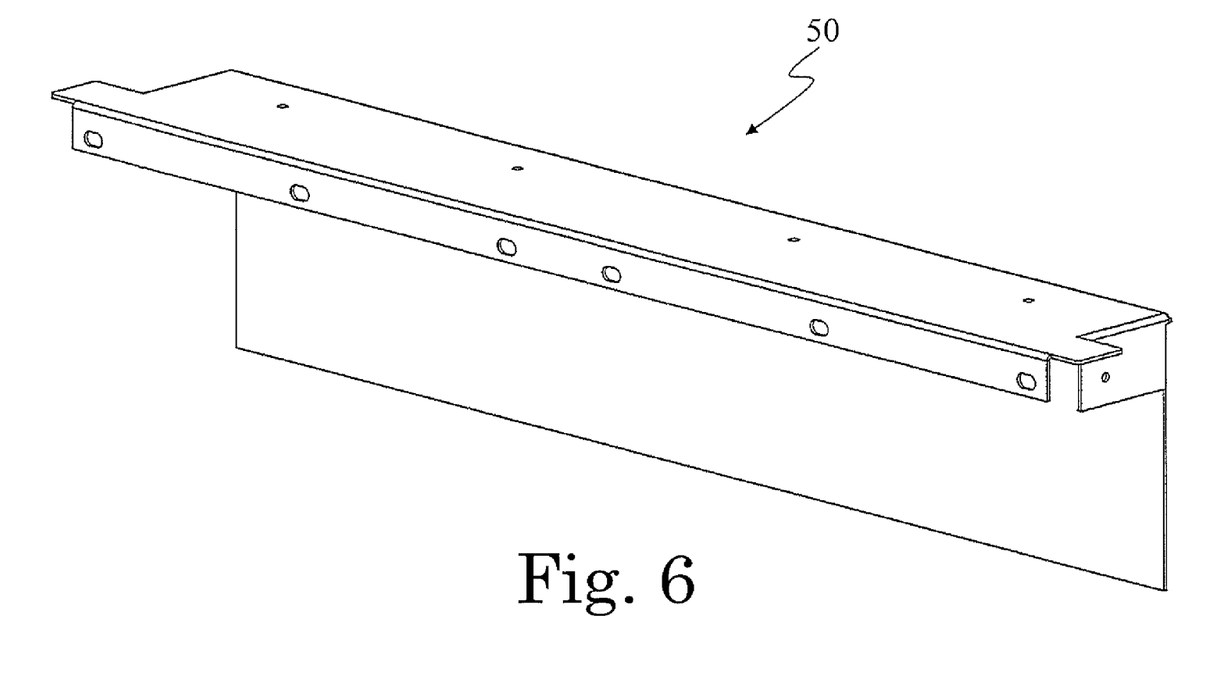

Finally, the arc protection assembly 10 may preferably further comprise a lower cover 40 and an upper cover 50, exemplary embodiments of which are illustrated in FIGS. 5 and 6, respectively.

Figure 7:
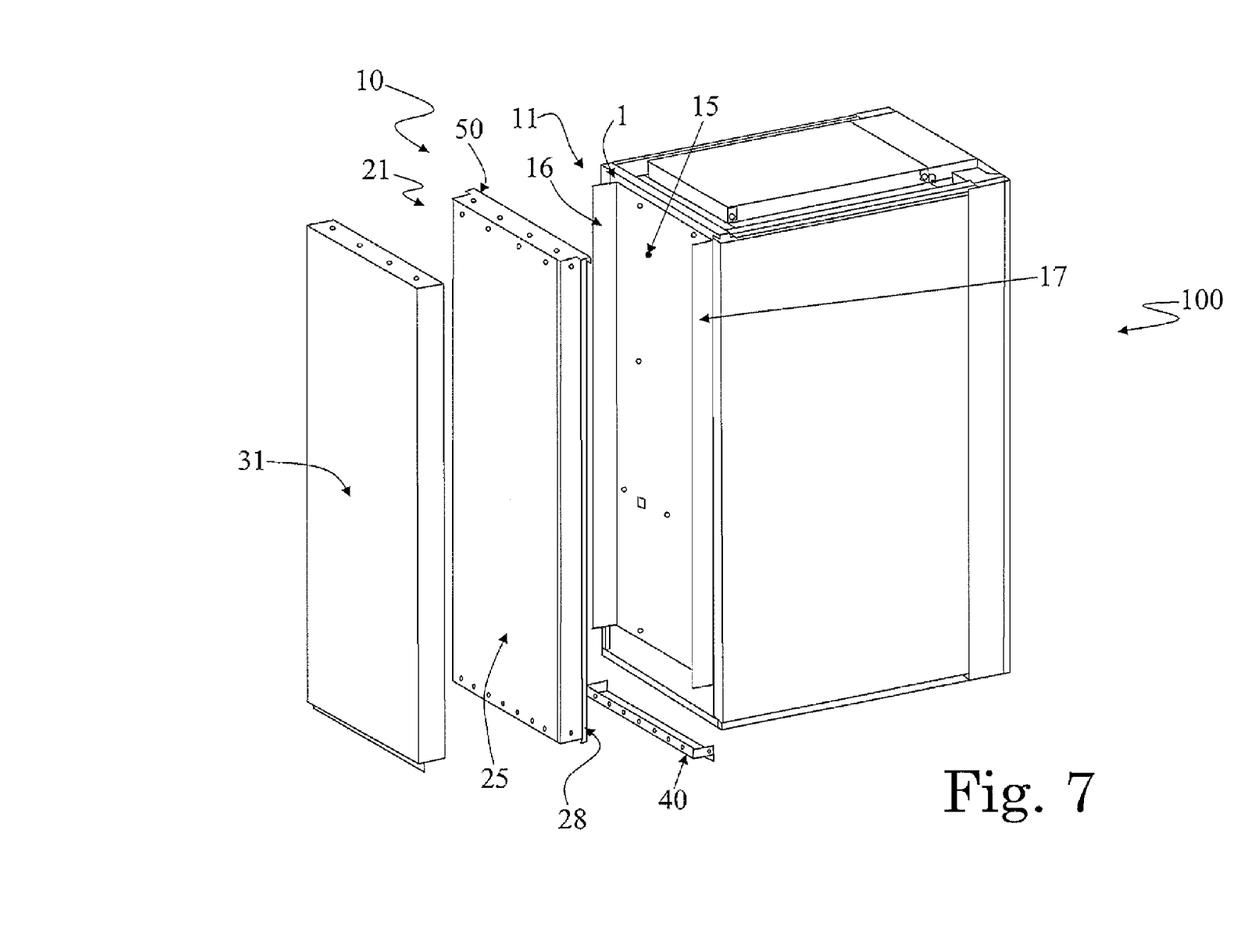
FIGS. 7 and 8 show the arc protection assembly of FIG. 1 during assembly.
Figure 8:
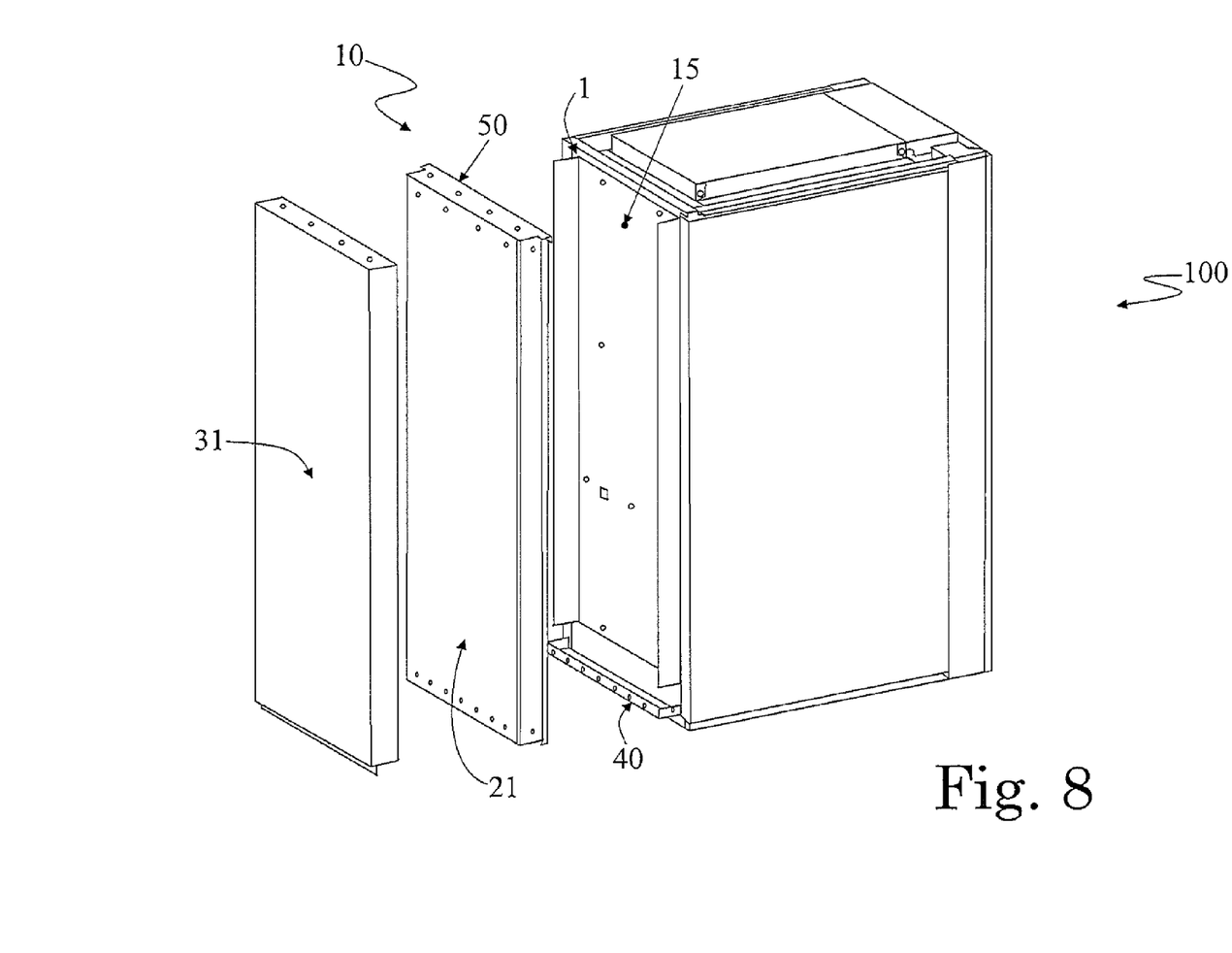
Figure 9:
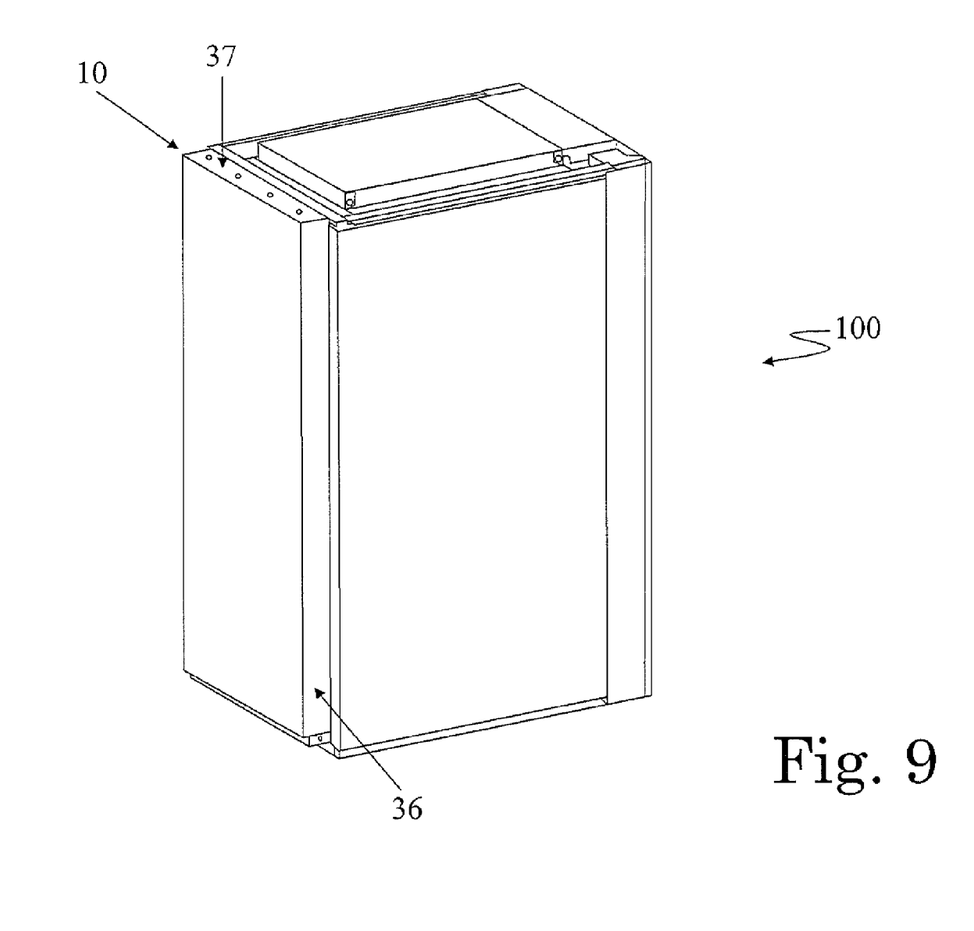
FIG. 9 shows the arc protection assembly of FIG. 1 after assembly.

As shown in FIGS. 7-8, the first barrier element 11 is positioned with the first surface 15 facing the first wall 1 provided with the opening(s) 7. Preferably, the central side which forms the first surface 15 of the first barrier element 11 is fixed to the first wall 1 with the lateral sides 16, 17 of the first barrier element 11 protruding from the central side 15 away from the first wall 1.

In the exemplary embodiment illustrated, the lower cover 50 is positioned close to the bottom end of the first barrier element 11 and is fixed to the rear wall 1. The second barrier element 21 is positioned with the second surface 25 facing the first surface 15 so that the one or more second through openings 22 are at least partially off-set with respect to the one or more first through openings 12. Preferably, the second barrier 21 is first connected to the upper cover 50 and is then positioned so as to surround the first barrier element 11 and with the central side of the second barrier element 21 forming the second surface 25 which faces the first surface 15 and with the lateral sides 26, 27 of the second barrier element 21 protruding towards and being connected to the rear wall 1 of the enclosure, by means of the folded rims 28.

When used, the third barrier element 31 is positioned with the third surface 35 facing the second surface 25 from the opposite side with respect to the first surface 15 and in such a way that the one or more third through openings 32 are at least partially off-set with respect to the one or more second through openings 22. Preferably, the third barrier element 31 is operatively connected, e.g., screwed, to the other part of the assembly 10 from the opposite side with respect to the first barrier element 11 with reference to the second surface 25, with the sides 36, 37 substantially enclosing the corresponding parts of the barrier elements 11, 21 and the upper cover 50 as well.

In this way the arc protection assembly 10 defines an overall, substantially confined, interior space which receives the byproducts of an electric arc struck in the enclosure.

The upper cover 50 and the lower cover 40 can be also used when the third barrier element 31 is not used, and therefore they may be likewise operatively connected to the first and second barrier elements 11, 21 at the top and bottom ends thereof, respectively.

The switchgear panel 100 according to the present invention offers an improved arc protection system with advantages over the known prior art in a simple and effective manner. In particular, the assembly 10 defines, as a whole, a confined environment inside which the resulting effects of an electric arc are conveyed. The parts of each barrier element that are not perforated stop some of the arc-generated products, while the sets of first, second, and when used, third through openings, allow the passage of some other arc-generated products. By using different venting areas, and particularly through venting areas of decreasing size towards the direction of movement of the arc-generated products from the interior of the enclosure towards the open environment, the assembly 10 behaves like a suppressor. In acting as a suppressor, the assembly 10 extinguishes the hot gases and flames inside the assembly 10, or outside the assembly 10 at a short distance compatible with relevant safety standard requirements and tests.

The electric switchgear panel 100 thus conceived may undergo numerous modifications and come in several variants, all falling within the scope of the inventive concept as defined by the appended claims. For example, the various barrier elements may be differently shaped, or they may be differently positioned with respect to each other and to the associated enclosure. The barrier elements may also be connected in a different configuration. Additionally, the assembly 10 can be connected to another wall of the enclosure, for instance the roof wall or any other wall of the enclosure. The component materials and dimensions of the switchgear may be of any type, according to needs and the state of the art and provided they are compatible with the scope of the invention as defined in the appended claims.

What is claimed is:

1. A switchgear panel comprising: an enclosure having a plurality of walls which delimit an internal volume suitable to accommodate corresponding electrical or electronic equipment, at least a first wall of said plurality of walls being provided with one or more openings for venting outside the enclosure hot gases and particulates, which may be generated when an arc strikes inside the panel; and an arc protection assembly which is positioned outside the enclosure and is operatively associated to at least said first wall and comprises at least a first barrier element having a first surface which is provided with one or more first through openings defining each a first venting area through which said hot gases and particulates coming from the inside of the enclosure can pass through, and a second barrier element which is operatively associated to said first barrier element and comprises a second surface provided with one or more second through openings defining each a second venting area through which can pass the hot gases and particulates, coming from the inside of the enclosure and having already passed said one or more openings and the first openings wherein the first venting area of each first through opening of said one or more first through openings is different from the second venting area of each second through opening of said one or more second through openings.

2. The switchgear panel according to claim 1 wherein the first venting area defined by each first through opening of said one or more first through openings is larger than the second venting area of each second through opening of said one or more second through openings.

3. The switchgear panel according to claim 2 wherein the second venting area of each second through opening of said one or more second through openings is between about 5% to about 50% of the first venting area defined by each first through opening of said one or more first through openings.

4. The switchgear panel according to claim 1 wherein said one or more first through openings are randomly positioned on said first surface.

5. The switchgear panel according to claim 1 wherein said one or more second through openings are randomly positioned on said second surface.

6. The switchgear panel according to claim 1 wherein said first barrier element is positioned with said first surface facing said first wall and said second barrier element is positioned with said second surface facing said first surface so that said one or more second through openings are at least partially off-set with respect to said one or more first through openings.

7. The switchgear panel according to claim 1 wherein said arc protection assembly comprises a third barrier element which is operatively associated to at least one of said first and second barrier elements.

8. The switchgear panel according to claim 7 wherein said third barrier element comprises a third surface which is provided with one or more third through openings defining each a third venting area.

9. The switchgear panel according to claim 8 wherein said one or more third through openings are randomly positioned on said third surface.

10. The switchgear panel according to claim 8 wherein the third venting area of each third through opening of said one or more third through openings is different from at least one of the first venting area defined by each first through opening of said one or more first through openings and the second venting area defined by each second through opening of said one or more second through openings.

11. The switchgear panel according to claim 10 wherein the third venting area of each third through opening of said one or more third through openings is smaller than the first venting area defined by each first through opening of said one or more first through openings.

12. The switchgear panel according to claim 10 wherein the third venting area of each third through opening of said one or more third through openings is smaller than the second venting area defined by each second through opening of said one or more second through openings.

13. The switchgear panel according to claim 8 wherein the third venting area of each third through opening of said one or more third through openings is between about 3% to about 30% of the first venting area defined by each first through opening of said one or more first through openings.

14. The switchgear panel according to claim 7 wherein said third barrier element is positioned with said third surface facing said second surface from the opposite side with respect to said first surface and in such a way that said one or more third through openings are at least partially off-set with respect to said one or more second through openings.

15. The switchgear panel according to claim 7 wherein said first barrier element is U-shaped with a central side of said first barrier element which forms said first surface that is fixed to said first wall and lateral sides of said first barrier element protruding from said central side away from said first wall, and wherein said second barrier element is U-shaped and is positioned so that said second barrier element surrounds said first barrier element with a central side of said second barrier element forming said second surface and facing said first surface and with said lateral sides of said second barrier element protruding towards and being connected to corresponding walls of the enclosure, and wherein said third barrier element is positioned, relative to said second surface, from the opposite side with respect to the first barrier element, and wherein the arc protection assembly further comprises an upper cover and a lower cover which are operatively associated to one or more of said first, second, and third barrier elements.

16. A switchgear panel comprising: an enclosure having a plurality of walls which delimit an internal volume suitable to accommodate corresponding electrical or electronic equipment, at least a first wall of said plurality of walls being provided with one or more openings for venting outside the enclosure hot gases and particulates, which may be generated when an arc strikes inside the panel; and an arc protection assembly which is positioned outside the enclosure and operatively associated to at least said first wall and comprises at least a first barrier element having a first surface which is provided with one or more first through openings defining each a first venting area through which said hot gases and particulates coming from the inside of the enclosure can pass through, and a second barrier element which is operatively associated to said first barrier element and comprises a second surface provided with one or more second through openings defining each a second venting area through which can pass the hot gases and particulates, coming from the inside of the enclosure and having already passed said one or more openings and the first openings, wherein the first venting area of each first through opening of said one or more first through openings has a predetermined size that is different from the second venting area of each second through opening of said one or more second through openings.

* * * * *